Feb. 1, 1966
H. S. HABER ETAL
3,232,851
SAMPLE ANALYSIS
Filed Nov. 14, 1960
3 Sheets-Sheet 2
FIG_2
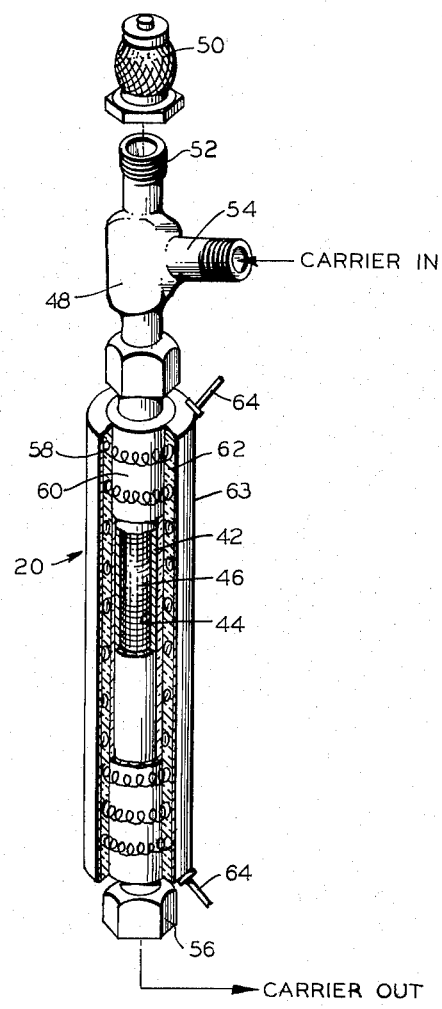
FIG_3
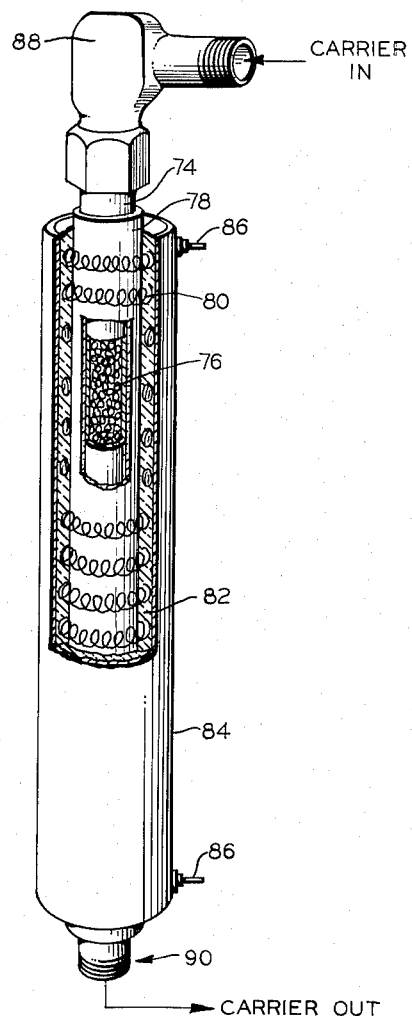
INVENTORS
HERBERT S. HABER
MICHAEL CZUHA, JR.
KENNETH W GARDINER
BY Christie, Parker & Hale
ATTORNEYS

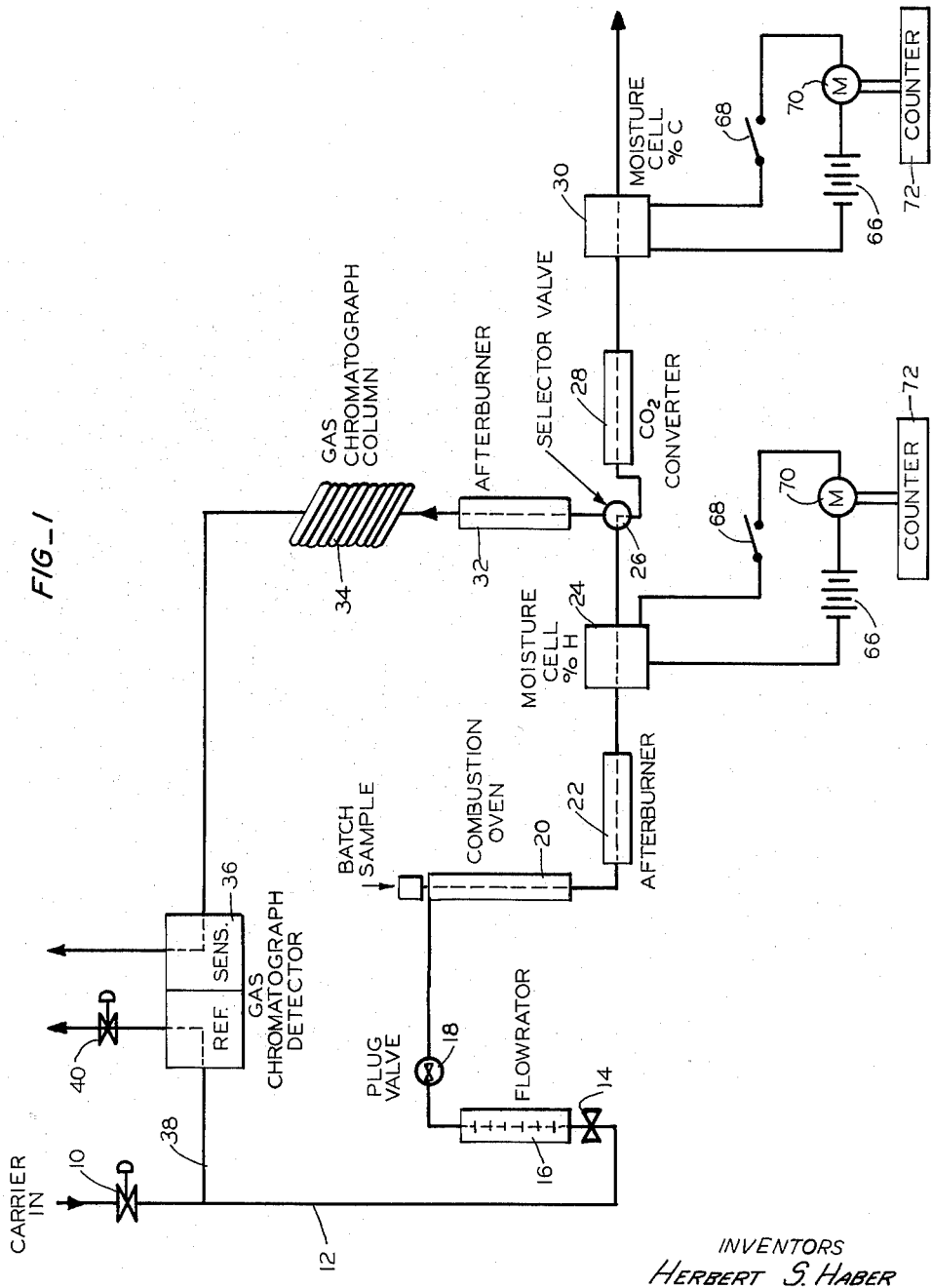

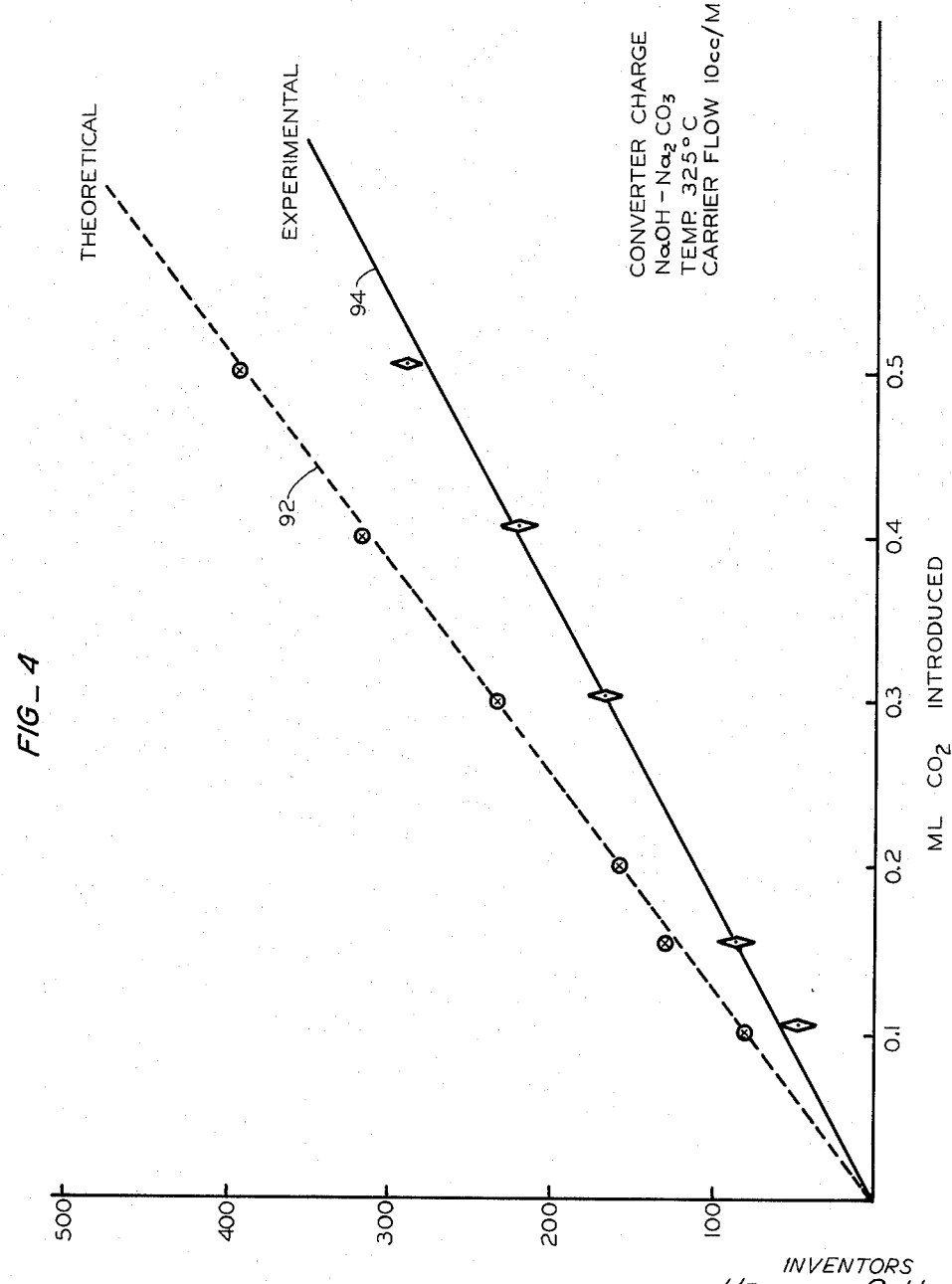

United States Patent Office 3,232,851
Patented Feb. 1, 1966

3,232,851
SAMPLE ANALYSIS
Herbert S. Haber, Arcadia, Michael Czuha, Jr., Temple City, and Kenneth W. Gardiner, Pasadena, Calif., assignors to Consolidated Electrodynamics Corporation, Pasadena, Calif., a corporation of California
Filed Nov. 14, 1960, Ser. No. 68,805
15 Claims. (Cl. 204—1)

This invention relates to apparatus and methods for determining the carbon and hydrogen present in organic compounds.

The percentage of carbon and hydrogen in organic compounds and the carbon to hydrogen (C/H) ratio is of paramount importance in organic synthesis research and in the manufacture of hydrocarbon fuels. For example, in refining crude oil to make gasoline and other fuels, it is desirable to have the C/H ratio as low as possible for maximum energy per pound of fuel. Accordingly, there is a need for a simple, routine procedure for measuring the C/H ratio of hydrocarbons. Conventional methods depend on sample weighing, combustion of the sample, and absorption of the combustion products in absorption tubes, which must be weighed before and after absorption. Thus, the prior art procedure is time consuming and fraught with experimental difficulties, and requires, for precision, skilled laboratory staffs whose time could be spent more productively on other work of a less routine nature.

This invention provides a comparatively low-cost, reliable and compact system for the high speed analysis for carbon and hydrogen in organic samples.

In terms of method, the carbon and hydrogen in an organic compound is determined by oxidizing or burning the compound to form water and carbon dioxide. The amount of water so formed is recorded. The carbon dioxide is reacted to form water, and the amount of water formed in that reaction is recorded as a measure of the carbon in the sample.

In the preferred form of the invention, the water is recorded by decomposing it electrolytically, and carbon dioxide is reacted with an alkali metal hydroxide to form water, which is also detected electrolytically. Preferably, the reaction of the carbon dioxide with the alkali metal hydroxide is in the range between about 225° to about 350° C., and the alkali metal hydroxide is supported on an inert, non-porous base, such as an alkali metal carbonate or silicon carbide (carborundum).

The preferred method for forming water from carbon dioxide is to react the carbon dioxide with lithium hydroxide supported on silicon carbide at a temperature between about 250° C. to about 275° C.

In terms of apparatus, the invention contemplates a combustion oven having an inlet and outlet for the organic compound and oxygen. Means are provided for heating the compound and oxygen in the oven to oxidize the compound to form carbon dioxide and water. A first electrolytic cell has an inlet connected to the outlet of the combustion oven and an outlet connected to the inlet of a converter for reacting carbon dioxide to form water. Means are provided for applying a voltage to the first electrolytic cell to decompose water passed through it to measure the amount of hydrogen in the sample. A hydrogen-containing reactant is disposed in the converter to react with carbon dioxide and form water. A second electrolytic cell has its inlet connected to the outlet of the carbon dioxide converter, and means are provided for applying a voltage to the second electrolytic cell to decompose the water as a measure of the amount of carbon in the sample.

Preferably, an afterburner is located between the oven and first electrolytic cell to insure complete combustion of the organic compound to water and carbon dioxide.

In the preferred form of the apparatus, the combustion oven comprises a chamber and a catalyst disposed in it. A ceramic sleeve is disposed around the chamber, and heating means are disposed around the ceramic sleeve. Insulation is disposed around the heating means to conserve heat. The catalyst can be any suitable material such as platinum or platinum gauze.

The converter for reacting carbon dioxide with a hydrogen-containing material to form water comprises a reaction chamber having an inlet and an outlet. An alkali metal hydroxide is disposed in the chamber, and means are provided for heating the alkali metal hydroxide to convert the hydroxide and carbon dioxide in the chamber to water and an alkali metal carbonate.

Preferably a ceramic layer is disposed around the reaction chamber, and a heating element is mounted on the ceramic layer. Insulation is provided around the heating element to reduce power requirements.

The alkali metal hydroxide is preferably supported on a non-porous, inert base such as an alkali metal carbonate, or silicon carbide.

These and other aspects of the invention will be more fully understood from the following detailed description taken in conjunction with the accompanying drawing in which:

FIG. 1 is a schematic flow diagram showing the presently preferred form of the invention;

FIG. 2 is a perspective view, partly broken away, of the presently preferred form of the combustion oven;

FIG. 3 is a perspective view, partly broken away, of the presently preferred form of the carbon dioxide converter; and FIG. 4 is a graph showing the efficiency of conversion of carbon dioxide to water with the converter shown in FIG. 3.

Referring to FIG. 1, a carrier gas such as oxygen flows through a first valve 10 in a supply line 12 which is connected through a second valve 14 to one end of a flow meter 16. The other end of the flow meter is connected through a plug valve 18 to the inlet of a combustion oven 20, the outlet of which is connected to the inlet of a first afterburner 22. The outlet of the first afterburner is connected to the inlet of a moisture measuring cell 24, which may be of any suitable electrolytic type that decomposes water to form hydrogen and oxygen. One suitable type of electrolytic cell is disclosed in U.S. Patent 2,816,-067. The outlet of the first moisture cell is connected to a two way selector valve 26, which when in the position shown in FIG. 1, connects the outlet of the first moisture cell to the inlet of a carbon dioxide converter 28, the outlet of which is connected to the inlet of a second moisture measuring cell 30, which may be of an electrolytic type identical with the first moisture measuring cell.

When the selector valve 26 is rotated 90° in a clockwise direction (as viewed in FIG. 1) the outlet of the moisture cell is connected to the inlet of a second afterburner 32, the outlet of which is connected to the inlet of a gas chromatograph column 34, which may be of conventional type. The outlet of the gas chromatograph column is connected to a conventional gas chromatograph thermal conductivity detector 36 for measuring component concentrations in the effluent of the gas chromatograph column.

As shown in FIG. 1, thermal conductivity detection is made in the detector 36 with a separate carrier gas to the reference side of the detector block to improve the signal-to-noise ratio. The separate supply of oxygen carrier gas is provided through a line 38, and valve 40 permits regulation of the flow of oxygen carrier gas through the reference side of the detector.

Referring to FIG. 2, the combustion oven 20 includes a nickel tube 42, which forms a centrally located chamber 44 packed with a suitable catalyst such as platinum gauze 46. A conventional T-fitting 48 is coupled to the inlet end of the combustion oven so that a removable cap 50 can be unscrewed from a threaded connection 52 to permit a sample to be dropped into the combustion oven. Oxygen carrier gas enters the inlet of the oven through the other threaded connection 54. The opposite end of the nickel tubing is provided with a conventional tubing coupling 56 which permits it to be connected to the inlet of the first afterburner.

A Nichrome heating wire 58 is wrapped around the exterior of a ceramic tube 60 disposed coaxially around the nickel tube. An insulating material such as "Fiberfrax" 62 with an aluminum backing 63 is wrapped around the Nichrome heating element and ceramic tube.

Although the details of the combustion oven can vary considerably, and the dimensions are not critical, we have found that a suitable combustion oven is easily fabricated by using a ¼" diameter nickel tubing about 4" long and adapted to take a Monel "T" fitting. The nickel tube is packed to about ½ the length of the tube with platinum gauze and heat is supplied externally from about 20 feet of No. 26 Nichrome heating wire. The Nichrome wire is wound in a tight helix on a .050 inch mandrel and the helix is arrayed in twelve turns over a ¼ inch I.D. ceramic tube. The ends of the Nichrome heating coil are covered with ceramic beads 64 to prevent shorting. The complete heater assembly is insulated as shown, and the nickel tube is then slipped inside the ceramic sleeve. The assembly is then mounted in the vertical position shown in FIG. 2. The combustion oven is loaded through the top of the monel fitting which is made gas tight with the cap 50. Power consumption for the combustion oven is approximately 200 watts at a line voltage of 110 volts A.C., and a temperature of 750° C. is attained in the platinum gauze in about 90 seconds.

The after burners are constructed substantially identical with the combustion oven. They are wired in series, and their combined power consumption is about 200 watts.

The moisture measuring cell includes two spaced 5 mil platinum wire electrodes encased in Pyrex capillary tube. A thin film of $P_2O_5$ is deposited over the platinum wire electrodes. Upon entering the glass capillary, water vapor is immediately absorbed by the $P_2O_5$ and electrolyzed into hydrogen and oxygen by applying a D.C. voltage from a battery or other suitable power supply 66 connected at its opposite terminals to the two platinum wire electrodes. The integrating circuit includes a separate D.C. power supply, an off-on switch 68, and a low inertia, integrating motor 70 having an output shaft encoupled to a suitable counter 72 such as a cyclometer counter. A similar system is provided for the second moisture cell and its description is not repeated in detail. However, like reference numerals are used to identify like components.

The carbon dioxide converter shown in FIG. 3 includes a nickel tube 74 filled with hydrogen-containing material 76 that reacts with carbon dioxide to form water. At the present time we prefer to use an alkali metal hydroxide supported on a non-porous inert base, such as an alkali metal carbonate or other non-porous material such as silicon carbide (carborundum). A ceramic tube (say alundum) 78 is disposed around the nickel tube and wrapped with a Nichrome heating element 80, which in turn is surrounded by an insulating material 82 such as potassium titanate, which is held within a cylindrical case 84. The ends of the Nichrome heating element extend through glass beads 86 which insulate the heater from the case. The inlet of the nickel tube is adapted to receive a conventional L tubing fitting 88, and the outlet end of the nickel tube is externally threaded at 90 to receive a conventional tubing fitting (not shown).

The alkali metal hydroxide can be deposited on a suitable inert non-porous base by any one of several different techniques. One method we have found satisfactory includes making a slurry by heating a concentrated solution of NaOH. The concentrated slurry is mixed with sodium carbonate pellets, which are then drained and dried, leaving a coating of sodium hydroxide on the pellets. If necessary, the pellets are screened to obtain uniform particle size. In some cases, it is desirable to grind the sodium carbonate prior to coating to obtain the required particle size.

The hydroxides of lithium, potassium, rubidium, and cesium are deposited on inert bases in much the same manner as described above for the sodium hydroxide. Other base materials are silicon carbide (carborundum) or gold plated spheres made of non-porous materials such as glass, plastic, metal, etc. The spheres may also be platinum-plated.

At the present time, lithium hydroxide is the preferred material because its hydrates are less stable, and therefore there is less tendency for water to be held up in the converter. Although other alkali metals such as sodium, potassium, rubidium, and cesium are satisfactory, their hydrates appear to be more stable, and therefore have a tendency to hold up some water. However, this is not objectionable provided the same degree of hydration is maintained during a particular run. Therefore, it is desirable to condition the alkali metal hydroxide in the converter prior to a measurement by passing carbon dioxide through the converter to establish a hydrate equilibrium.

It is desirable to operate the converter at a relatively high temperature to reduce hydrate hold up. However, excessive temperatures cause vaporization of the alkali metal hydroxide, which can interfere with the coating in the moisture cell. Therefore we have found it best to operate the converter at or below the molten point for the metal hydroxide to reduce its vaporization and keep hydrate hold-up at a minimum.

In using the apparatus shown in FIG. 1, a sample of suitable size, say 0.5 to 2.0 mg., of an organic sample, such as benzoic acid, is pelletized and accurately weighed. The sample is then introduced into the combustion oven. The after burners are turned on and air is purged from the oven with oxygen carrier gas for about one minute.

The plug valve controlling the oxygen carrier gas flow through the system is closed and the combustion oven is heated for approximately 90 seconds to raise the temperature to about 750° C.

During the preliminary heating cycle the cyclometer counters on the integrating motors are manually set on zero. When the heating cycle is completed, the plug valve is opened to admit oxygen carrier gas to the oven. The high temperature in the combustion oven causes substantially complete combustion of the sample to carbon dioxide gas and water vapor. The mixture from the combustion oven flows through the first afterburner to assure complete combustion of the sample. The gas mixture then passes through the first moisture cell where the water is decomposed electrolytically to hydrogen and oxygen. The amount of current required to decompose the water is integrated by the integrating motor and counter to provide a record of the hydrogen present in the sample.

The exact method by which the carbon dioxide is to be determined, i.e., conversion to water or by gas chromatograph, depends on the presence or absence of materials such as sulphur, halides, etc., which might poison the reactant material in the carbon dioxide converter. If none of these contaminants are present, the selector valve 26 is set as shown in FIG. 1 so that the gas stream, which is now a mixture of hydrogen, oxygen, and carbon dioxide, passes through the carbon dioxide converter where the following reaction takes place:

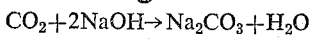

A gaseous mixture of water, oxygen, and hydrogen and a small amount of unconverted carbon dioxide flows from the carbon dioxide converter through the second moisture cell where the water vapor formed in the converter is decomposed electrolytically and recorded exactly as described for the first moisture cell.

FIG. 3 shows a plot of efficiency of conversion of carbon dioxide to water when the reacting material in the converter is sodium hydroxide on a sodium carbonate base maintained at a temperature of 325° C. with a carrier flow rate of 10 cc./min.

The dotted line 92 represents the theoretical reading of water in parts per million and the solid line 94 represents the actual or experimental results obtained for various amounts of carbon dioxide introduced at a flow rate of 10 cc./min. The experimental results are below the theoretical results due to the lack of time for the reaction to go to completion. The slower the carrier flow rate the closer the agreement between the theoretical and experimental curves. However, as a practical matter, the experimental results are easily calibrated in terms of theoretical results as long as the flow rate is known. Preferably, the carrier flow rate is maintained at a fixed value throughout the run. The linear relationship between the amount of $CO_2$ and water formed in the converter improves the accuracy of the integration of the current used in decomposing the water, and is an advantage over the non-linear response obtained when $CO_2$ is determined by gas chromatography.

When the integrations of the carbon dioxide and water signals have been compared, the percent carbon and percent hydrogen are easily determined from their respective calibration curves which are previously established by combustion of known quantities of the sample. If only the C/H ratio is desired, the sample need not be weighed at all.

When the sample contains a contaminant that may poison the carbon dioxide converter, the selector valve 26 is turned 90° clockwise from the position shown in FIG. 1 so that effluent from the first moisture cell passes through the second afterburner 32, the gas chromatograph column 34, and the detector 36. The second afterburner oxidizes the hydrogen generated in the first moisture cell to prevent interference with the carbon dioxide determination at the detector.

The gas chromatograph column can be of any suitable type. We have found that 4 feet of ⅛ inch diameter stainless steel tubing packed with 40–60 mesh fire brick makes an effective chromatograph column because no elaborate gas component separations are required. Response time for carbon dioxide signals is about one minute at a carrier gas flow rate of 10 ml./min., as contrasted to a response of about 30 seconds when the carbon dioxide is detected by conversion to water and electrolytical decomposition. Consequently, it is preferable to use the carbon dioxide converter whenever possible.

We claim:

1. The method for determining the carbon and hydrogen in an organic compound comprising the steps of oxidizing the compound to form water and carbon dioxide gas, electrolytically measuring the amount of water formed by the oxidation of the compound, reacting the carbon dioxide gas with a dry matrix comprised of an alkali metal hydroxide and an inert carrier therefor to convert the carbon dioxide gas to water, and electrolytically measuring the amount of water formed by the conversion of the carbon dioxide.

2. The method for determining the carbon and hydrogen in an organic compound comprising the steps of oxidizing the compound to form water and carbon dioxide gas, electrolytically measuring the amount of water formed by the oxidation of the compound, reacting the carbon dioxide gas with a dry matrix comprised of an alkali metal hydroxide at a temperature above the boiling point of water to form water vapor, and electrolytically measuring the amount of water vapor formed by the reaction of the carbon dioxide.

3. The method for determining the carbon and hydrogen in an organic compound comprising the steps of oxidizing the compound to form water and carbon dioxide gas, electrolytically measuring the amount of water formed by the oxidation of the compound, reacting the carbon dioxide with an essentially dry mixture of lithium hydroxide on carborundum at a temperature above the boiling point of water to form water vapor, and electrolytically measuring the amount of water vapor formed by the reaction of the carbon dioxide.

4. The method according to claim 3 in which the carbon dioxide is reacted with lithium hydroxide at a temperature between about 250° C. and about 275° C.

5. The method for determining the carbon and hydrogen in an organic compound comprising the steps of oxidizing the compound to form water and carbon dioxide gas, electrolytically measuring the amount of water formed by the oxidation of the compound, reacting the carbon dioxide gas with an essentially dry quantity of alkali metal hydroxide supported on a granular carrier therefor at a temperature between about 225° C. and about 350° C. to form water vapor, and electrolytically measuring the amount of water vapor formed by the conversion of the carbon dioxide.

6. The method according to claim 5 in which the alkali metal hydroxide is supported on an alkali metal carbonate.

7. The method according to claim 5 in which the alkali metal hydroxide is supported on silicon carbide.

8. Apparatus for determining the carbon and hydrogen in an organic compound, the apparatus comprising a combustion oven having an inlet and an outlet for the compound and oxygen, means for heating the compound and oxygen in the oven to oxidize the compound to form carbon dioxide gas and water, a first hydroscopic electrolytic cell having an inlet and an outlet, means connecting the oven outlet to the inlet of the first electrolytic cell, means for applying a voltage to the first electrolytic cell to decompose water in it, a converter for converting carbon dioxide gas to a proportionate quantity of water and having an inlet and an outlet, means connecting the outlet of the first electrolytic cell to the inlet of the converter, the converter containing a quantity of inert granular material adapted to be coated with an alkali metal hydroxide, and a second hygroscopic electrolytic cell having an inlet and an outlet, means connecting the outlet of the converter to the inlet of the second electrolytic cell, and means for applying a voltage to the second electrolytic cell to decompose water in it.

9. Apparatus according to claim 8 which includes an afterburner between the oven and the first electrolytic cell.

10. Apparatus according to claim 8 which includes a source of carrier gas to flow through the apparatus, and means for measuring the flow rate of the carrier gas.

11. Apparatus for determining the carbon and hydrogen in an organic compound, the apparatus comprising a combustion oven having an inlet and an outlet for the compound and oxygen, means for heating the compound and oxygen in the oven to oxidize the compound to form carbon dioxide gas and water, a first hygroscopic electrolytic cell having an inlet and an outlet, means connecting the oven outlet to the inlet of the first electrolytic cell, means for applying a voltage to the first electrolytic cell to decompose water in it, a converter for converting carbon dioxide gas to a proportionate quantity of water vapor and having an inlet and an outlet, means connecting the outlet of the first electrolytic cell to the inlet of the converter, the converter containing a quantity of inert granular material adapted to be coated with an alkali metal hydroxide and including a heater for heating the interior of the converter to a temperature above the boiling point of water, and a second hygroscopic electrolytic cell having an inlet and an outlet, means connecting the outlet of the converter to the inlet of the second electrolytic cell, and means for applying a voltage to the second electrolytic cell to decompose water in it.

12. Apparatus according to claim 11 which includes means for recording the electric current flowing through the first electrolytic cell, and means for recording the electric current flowing through the second electrolytic cell.

13. The method for determining the carbon and hydrogen in an organic compound comprising the steps of oxidizing the compound to form water and carbon dioxide, electrolytically measuring the amount of water formed by the oxidation of the compound, reacting the carbon dioxide with a dry matrix comprised of lithium hydroxide deposited on carborundum at a temperature between about 250° C. and about 275° C. to form water vapor, and electrolytically measuring the amount of water vapor formed by the reaction of the carbon dioxide.

14. Apparatus for determining the carbon and hydrogen in an organic compound, the apparatus comprising a combustion oven having an inlet and an outlet for the compound and oxygen, means for heating the compound and oxygen in the oven to oxidize the compound to form carbon dioxide and water vapor, a hygroscopic first electrolytic cell having an inlet and an outlet, means connecting the oven outlet to the inlet of the hygroscopic first electrolytic cell, means for applying a voltage to the hygroscopic first electrolytic cell to decompose moisture in it, a converter containing a dry reactant matrix for converting carbon dioxide gas to a proportionate quantity of water and having an inlet and an outlet, means connecting the outlet of the first hygroscopic electrolytic cell to the inlet of the converter, the matrix comprising lithium hydroxide disposed on silicon carbide particles, and means for heating the matrix to near the molten point of lithium hydroxide to convert the hydroxide and carbon dioxide in the chamber to water vapor and lithium carbonate, a second hygroscopic electrolytic cell having an inlet and an outlet, means connecting the outlet of the converter to the inlet of the second electrolytic cell, and means for applying a voltage to the second electrolytic cell to decompose water in it.

15. The method for determining the carbon and hydrogen in an organic compound comprising the steps of oxidizing the compound to form water and carbon dioxide gas, electrolytically measuring the amount of water formed by the oxidation of the compound, reacting the carbon dioxide gas with an essentially dry matrix comprised of a molten alkali metal hydroxide deposited on an inert granular carrier therefor at a temperature above the boiling point of water to form water vapor, and electrolytically measuring the amount of water vapor formed by the reaction of the carbon dioxide.

References Cited by the Examiner

UNITED STATES PATENTS

| | | | |
|---|---|---|---|
| 1,562,891 | 11/1925 | Klopstock et al. | 23—63 |
| 2,383,674 | 8/1945 | Osborne | 23—63 |
| 2,552,279 | 5/1951 | Houpt | 23—288 |
| 2,607,663 | 8/1952 | Perry et al. | 23—288 |
| 2,683,654 | 7/1954 | Bergman | 23—288 |
| 2,769,695 | 11/1956 | Frank | 23—288 |
| 2,809,928 | 10/1957 | Dudley et al. | 204—1 |
| 2,863,729 | 12/1958 | McDuffie et al. | 23—204 |
| 2,899,286 | 8/1959 | Miller | 23—288 |
| 2,967,089 | 1/1961 | Mills et al. | 23—204 |
| 3,006,836 | 10/1961 | Cole | 204—195 |
| 3,025,145 | 3/1962 | Terpenning | 23—288 |

OTHER REFERENCES

Keidel: "Analytical Chemistry," vol. 31, No. 12, December 1959, pages 2043–2048.

JOHN H. MACK, *Primary Examiner.*

JOHN R. SPECK, JOSEPH REBOLD, MURRAY TILLMAN, *Examiners.*